United States Patent [19]

Radtke

[11] Patent Number: 4,788,904
[45] Date of Patent: Dec. 6, 1988

[54] ASSEMBLY FOR COOLING VEHICLE PARTS

[75] Inventor: Wolfgang Radtke, Steinenbrück, Fed. Rep. of Germany

[73] Assignee: Siemens Aktiengesellschaft, Berlin & Munich, Fed. Rep. of Germany

[21] Appl. No.: 74,288

[22] Filed: Jul. 16, 1987

[30] Foreign Application Priority Data

Jul. 17, 1986 [DE] Fed. Rep. of Germany ....... 3624222

[51] Int. Cl.$^4$ .............................................. B60H 1/26
[52] U.S. Cl. ..................... 98/2.18; 98/2.02; 98/900
[58] Field of Search ............... 98/2, 2.01, 2.02, 2.15, 98/2.18, 900

[56] References Cited

FOREIGN PATENT DOCUMENTS

| 2603297 | 8/1977 | Fed. Rep. of Germany | 98/2.18 |
| 2720714 | 11/1978 | Fed. Rep. of Germany | 98/2.18 |
| 2543664 | 10/1984 | France | 98/2.18 |
| 140731 | 12/1978 | Japan | 98/2.18 |
| 11105 | 1/1982 | Japan | 98/2.18 |
| 218414 | 12/1983 | Japan | 98/2.18 |
| 38112 | 3/1984 | Japan | 98/2.18 |

Primary Examiner—Harold Joyce
Attorney, Agent, or Firm—Kenyon & Kenyon

[57] ABSTRACT

A solar energy collector for an automotive vehicle comprises an absorber panel and a cover panel spaced from one another to form an air flow channel. The passenger compartment of the vehicle communicates with the air flow channel via one or more openings, while the air flow channel communicates at a downstream side with the ambient atmosphere via one or more air outlets. The cover panel is made of a material transparent to incident solar radiation of optical frequencies and impervious to electromagnetic radiation of infrared frequencies. The absorber panel absorbs solar energy and transfers the heat energy so produced to air flowing through the air flow channel from the passenger compartment. The absorber panel is provided with support ribs on which the cover panel rests and with deflection ribs for deflecting the air stream and thereby enhancing heat transfer characteristics. The cover panel is advantageously connected to the absorber panel in a form lock fit which facilitates cleaning and maintenance of the absorber panel.

18 Claims, 2 Drawing Sheets

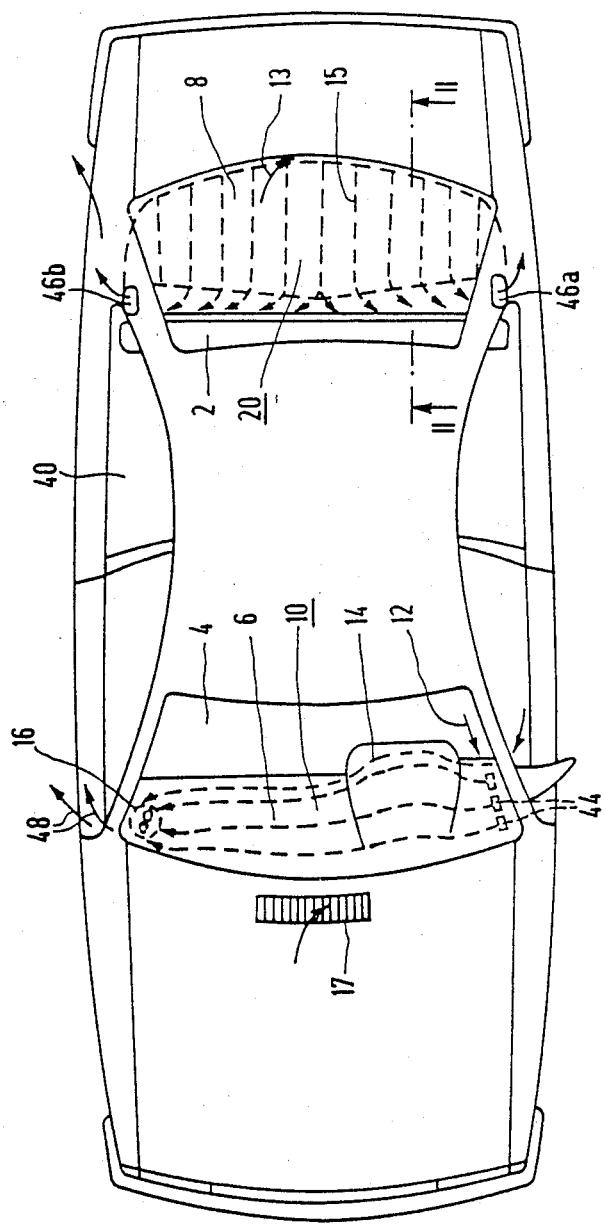

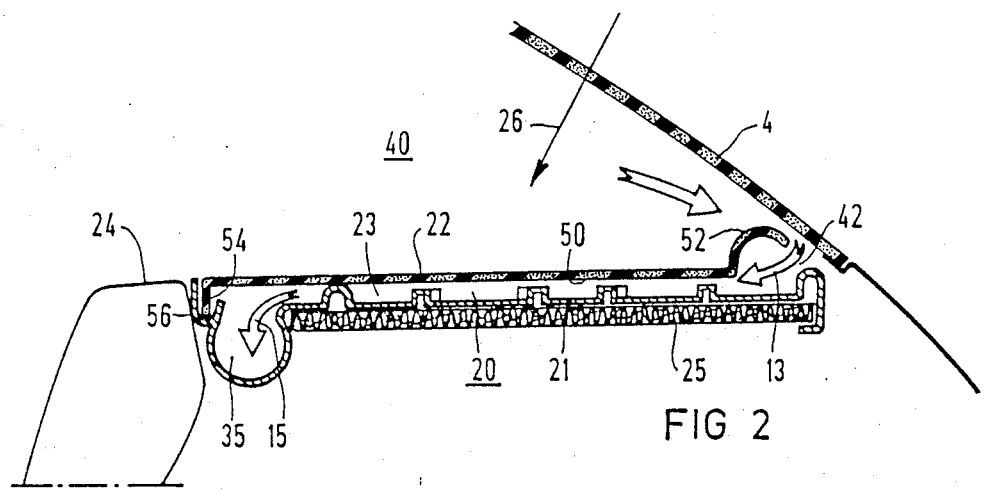
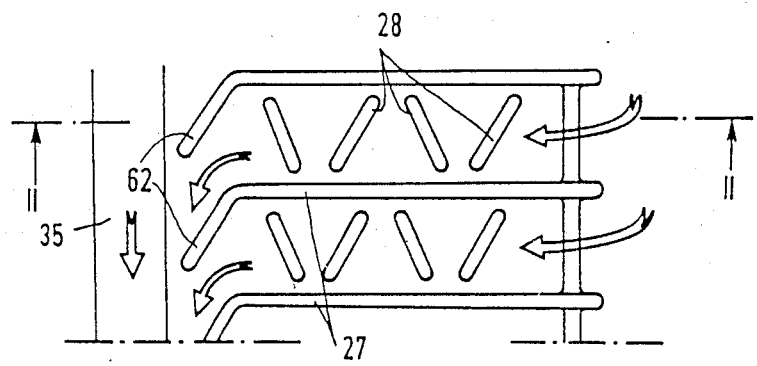
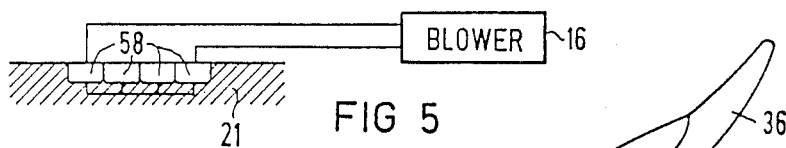
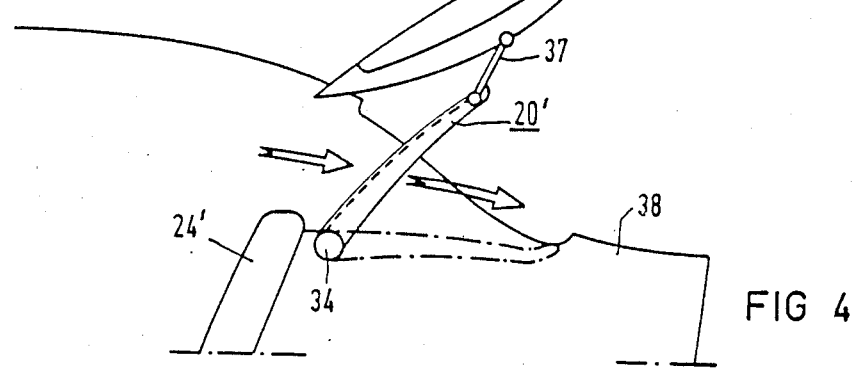

ASSEMBLY FOR COOLING VEHICLE PARTS

BACKGROUND OF THE INVENTION

This invention relates to an assembly for cooling vehicle parts. Specifically, the parts which may be cooled pursuant to the present invention include the dashboard and the hat rack surfaces in the passenger compartment of an automotive vehicle.

West German Offenlegungsschrift No. 26 03 297 discloses an assembly for cooling parts of an automotive vehicle, such as the tank space, which are heated through exposure to solar radiation. In addition, that patent document discloses the use of air from the passenger compartment to absorb heat. Spent air from the passenger compartment, prior to discharge into the atmosphere, is conducted along the heated vehicle parts for cooling those parts. In brief, vehicle parts outside the passenger compartment are cooled with air from the passenger compartment after the air has left the compartment.

In another assembly for cooling vehicle components, described in West German Offenlegungsschrift No. 27 20 714, the parts to be cooled are provided on their external surfaces with air conduction canals formed by molded parts. The molded parts are generally of heat insulating material and are shaped as plates each provided on a flat side with a multiplicity of parallel slots or baffles, each slot forming an air flow canal for air from the passenger compartment. The air flow canals are separated from each other by bracing or support ribs. Such a molded part can be positioned with the ribs on the bottom of the vehicle so that the flat side of the molded part is facing into the interior of the vehicle. With this arrangement also, vehicle parts located outside the passenger compartment are cooled.

It is well known that the front and rear windows of aerodynamically designed automobiles are oriented at relatively small angles with respect to the horizontal and are enlarged, with the result that a large amount of thermal energy is transmitted by solar radiation into the interiors of the vehicles. In middle European climates, the the passenger compartment of such a vehicle at rest may attain temperatures of 50 degrees Centigrade. When such a vehicle is moving, the heat transferred to the vehicle's passenger compartment by solar radiation can be removed from the vehicle in the absence of air conditioning only by introducing large amounts of air into the vehicle, exemplarily through open windows or an open roof. Opening the windows or roof of the automobile increases air resistance and defeats the aerodynamic design of the automobile's body.

The enlarged and flattened windows of the aerodynamically designed automobiles are accompanied by larger dashboard and hat rack surfaces at the front and the rear of the vehicles. Moreover, to eliminate reflections of the dashboard and hat rack surfaces in the front and rear windows, those surfaces are provided with a dark color, frequently black, which coloring greatly increases the extent to which incident solar radiation is absorbed by the surfaces and subsequently transferred into the passenger compartments of the vehicles.

An object of the present invention is to provide an improved method for reducing the heat transferred to the interior of a vehicle by incident solar radiation.

Another, related, object of the present invention is to provide an improved assembly for reducing the heat transferred to the interior of a vehicle by incident solar radiation.

Another, more specific, object of the present invention is to provide such an assembly which is simple and relatively inexpensive to manufacture.

Yet another specific object of the present invention is to provide such an assembly in which maintenance is simplified and facilitated.

SUMMARY OF THE INVENTION

An assembly for cooling portions of a motor vehicle exposed to incident solar radiation comprising, pursuant to the present invention, an absorber panel mounted to the vehicle in a passenger compartment thereof for absorbing incident solar energy and a cover panel for forming with the absorber panel an air flow channel. The cover panel is essentially transparent to optical wavelengths of electromagnetic radiation and impervious to infrared wavelengths and the air flow channel is located between the absorber panel and the cover panel. An air inlet opening communicates with the air flow channel for enabling the introduction of air from the passenger compartment of the vehicle into the air flow channel, while an air outlet opening communicates with the air flow channel for enabling the discharge of air from the air flow channel into the ambient atmosphere outside the vehicle.

The absorber panel and the cover panel preferably form a solar collector unit which can be disposed between the instrument panel of the vehicle and the lower edge of the front window to serve at least in part as substantially horizontally extending dashboard wall. Alternatively, the solar collector unit can be disposed between the rear seat of the vehicle and the lower edge of the rear window and thereby serve as a hat rack. Pursuant to the present invention, heat absorbed by such automobile parts as a dashboard surface or a hat rack surface in the passenger compartment of a vehicle is transferred to outflowing air from the passenger compartment and discharged from the vehicle before it can be transferred to the passenger compartment to increase the temperature thereof. In this way, the temperature of the passenger compartment can be maintained at approximately 40 degress Centigrade without the need for air conditioning.

In a special embodiment of a solar collector in accordance with the present invention, the surface of the cover panel facing the absorber panel can be provided with a surface layer which reflects heat radiation while being transparent to light, whereby only a small portion of the solar radiation incident on the cover panel is absorbed thereby and infrared energy given off by the absorber panel heats the cover panel only to a slight degree.

Advantageously, the cover panel is connected to the absorber panel by a form lock fit alone, which facilitates cleaning of the absorber panel and particularly minimizes time required to gain access to the absorber panel for cleaning and other maintenance acitivites.

To improve the heat transfer from the absorber panel to a stream of air passing through the air flow channel from the passenger compartment of a vehicle, the absorber panel is advantageously provided on a side facing the cover panel with a plurality of air deflection ribs. Such ribs can simultaneously serve to support the cover panel on the absorber panel.

In the case of a hatchback automobile, the solar collector can be connected to the hatchback door so that the collector can be tilted therewith.

BRIEF DESCRIPTION OF THE DRAWING

FIG. 1 is a top view of an automotive passenger vehicle, showing cooling assemblies in accordance with the present invention at a dashboard and a hat rack of the vehicle.

FIG. 2 is a partial cross sectional view, partially schematic, taken along line II—II in FIG. 1 and along line II—II in FIG. 8, showing an absorber panel and a cover panel.

FIG. 8 is a partial top view of the absorber panel of FIG. 2.

FIG. 4 is a schematic side elevational view of another embodiment of a cooling assembly in accordance with the present invention, showing a hatchback type vehicle with a swingably mounted solar collector.

FIG. 5 is a partial schematic cross sectional view of a special embodiment of the absorber panel of FIG. 2.

DETAILED DESCRIPTION

An aerodynamically designed automobile illustrated in FIG. 1 is provided for aerodynamic reasons with a rear window 2 and a front window 4 both inclined at relatively small angles with respect to the horizontal. The shallow angle of inclination of the front and rear windows permits a large amount of solar radiation to fall on a horizontal surface of a dashboard 6 and a horizontal hat rack 8. To absorb the heat energy resulting from the incident solar radiation and to dispose of that energy, or at least a substantial portion thereof, so that the passenger compartment 40 of the vehicle is not heated owing to the incident solar radiation, solar collectors 10 and 20 in accordance with the invention are provided at dashboard 6 and hat rack 8, respectively. The energy collecting surfaces of collectors 10 and 20 are heavily exposed to solar radiation because of the shallow inclination of the front and rear windows 4 and 2. Collector 10 is disposed between the instrument panel of the vehicle and the lower edge of the front window and serves at least in part as a substantially horizontally extending dashboard wall. Collector 20 is disposed between the rear seat of the vehicle and the lower edge of the rear window and thereby may serve as hat rack 8.

As depicted in FIG. 2, collector 20 includes an absorber panel 21 mounted to the vehicle in the passenger compartment thereof for absorbing incident solar energy (represented by arrow 26) and a cover panel 22 for forming with absorber panel 21 an air flow channel 23. Cover panel 22 is essentially transparent to optical wavelengths of electromagnetic radiation, at least approximately in the same wavelength range that rear window 2 itself is transparent to electromagnetic radiation, and impervious to infrared wavelengths (thermal radiation). For further reducing the absorption of infrared energy by cover panel 22, the panel may be provided on a surface facing absorber panel 21 with a surface treatment or layer 50 which reflects infrared radiation. In another advantageous embodiment, cover panel 22 can be made of several layers or can consist of radiation-transparent foam in order to insulate the surface which faces absorber panel 21. Below absorber panel 21, heat insulation 25 (FIG. 2) can be also provided to advantage.

One or more air inlet openings 42 communicate with air flow channel 23 for enabling the introduction of air from passenger compartment 40 into the air flow channel, as indicated by arrow 13 (FIGS. 1 and 2). Pursuant to the present invention, the air inlet openings may be disposed centrally with respect to the rear window, as indicated in FIG. 1 by air flow arrow 13. Alternatively, the air inflow openings may be disposed at the side of the window or underneath the dashboard 6 or hat rack 8. Side-disposed entrance openings 44 are indicated in FIG. 1 for collector 10 at front window 4.

One or more an air outlet openings 46a and 46b (FIG. 1) communicate with air flow channel 23 for enabling the discharge of air from the air flow channel into the ambient atmosphere outside the vehicle. Generally, the air discharge openings are located at the sides of the vehicle, as indicated by air flow arrows 48 for front collector 10 in FIG. 1.

A special fan or blower 16 may be provided at dashboard 6 and/or at hat rack B for drawing air from passenger compartment 40 through air flow channel 23. However, the overpressure in the passenger compartment relative to the external skin of the vehicle owing to a customarily built-in heater or blower or owing to a pressure head for discharging air from the passenger compartment can be utilized, as shown for the hat rack at the rear of the vehicle in FIG. 1.

The flow direction of air suctioned off from passenger compartment 40 is indicated by arrows 12 and 13 in FIGS. 1 and 2. Further directional arrows 14 and 15 show the flow direction through air flow channel 28, between absorber panel 21 and cover panel 22. It is to be noted that the flow directions depend on the physical arrangement of the air inlet and outlet openings.

As illustrated in FIG. 2, cover panel 22 can be provided at a rear end with an upwardly projecting arcuate edge portion 52 formed in such a manner as to provide an aerodynamically advantageous air feed for air flow channel 28. The edge of cover panel 22 facing rear window 4 can be provided with spacers (not illustrated) for assuring a predetermined spacng from rear window 4 and from absorber panel 21 even in the event that cover panel 22 is slightly deformed. Cover panel 22 is preferably formed at a forward end with a downwardly projecting angled off portion 54 for insertion in a form fit into a U-shaped support 56 at a forward end of absorber panel 21. Support 56 is itself attached to a C-shaped exhaust channel 85 which communicates with air flow channel 28 and with exhaust or discharge openings 46a and 46b. By means of angled off portion 54 and support 56, cover panel 22 can be mounted and fixed into position on absorber panel 21 without special detachable connections. Moreover, cover panel 22 can be removed from absorber panel 21 without the application of a substantial amount of force.

The surface of collector 10 or 20 exposed to the sun can be equipped with a separate blower (not shown) which can be controlled in dependence on the temperature or on the amount of incident radiation. As depicted in FIG. 5, the dark heat-absorbing surface of absorber panel 21 can be provided, in a special embodiment of the invention, with solar cells which generate electrical current fed to a blower (e.g., blower 16) or to a conventional ventilating system in an engine compartment of the vehicle.

As shown in FIG. 3, absorber panel 21 is advantageously provided with support ribs 27 on which cover panel 22 rests. Between support ribs 27 are provided deflection ribs 28 for deflecting the air flowing through air flow channel 23 to improve heat transfer between absorber panel 21 and the flowing air. Support ribs also serve to guide the flowing air and are provided at their downstream ends with bent terminal portions 62 for deflecting the air laterally into exhaust channel 35. Deflection ribs 28 may also aid in supporting cover panel 22.

In an embodiment of an assembly for cooling automobile parts at a rear end of a hatchback type motor vehicle, illustrated in FIG. 4, a solar energy collector 20' is mounted at its forward end, i.e., at its end facing a rear seat 24' of the hatchback vehicle, via a rotary or pivotable joint 84 to the vehicle. The collector is coupled at a rear end via a lever connection 37 to a hatchback door 36, whereby collector 20' is automatically pivoted to provide access to a luggage space upon a swinging open of the hatchback door.

In hatchback automobiles, a tiltable surface can be provided which, in the region of a lower edge of the rear window, sucks up air from the passenger compartment and is provided with an air canal oppostie the suction point. The air canal can lead on one or both sides in the vicinity of pivot bearing or joint 84 to a round seal so that an air tight connection is provided which, however, also enables a swinging of the collector 20' up from a substantially horizontal rest position.

Cover panel 22 can consist, in the case of a hatchback automobile, of a foil which can be rolled up and which covers a luggage compartment. The dark, heat-absorbing surface of absorber panel 21 can be designed as a further foil disposed below the cover panel 22 or can form a lower wall of the luggage compartment. In the latter case, a stream of air from the passenger compartment also serves to ventilate the luggage compartment.

A heat insulating support for collector 10 at dashboard 6 (FIG. 1) can also provide collision protection for passengers. The space between the cover panel and the absorber panel of collector 10 (collector 10 having a structure similar to the structure, described hereinabove, of collector 20) may be provided with a porous dark material for improving the visual appearance of the dashboard (or hat rack) and for cushioning the impact surface. Air is conducted through pores in the dark cushioning material and is subsequently discharged to the atmosphere.

The air used for cooling the engine parts may in some circumstances be drawn from outside the vehicle through interstitial spaces in the body of the vehicle.

In the embodiment of the present invention described herein with reference to FIGS. 1–3, solar collectors 10 and 20 for the dashboard 6 and the hat rack 8 of a vehicle are provided. It is also possible to provide similar solar energy collectors for other vehicle parts in the passenger compartment of the vehicle, such as the upper regions of the door linings which are exposed to solar radiation.

What is claimed is:

1. An assembly for cooling portions of a motor vehicle exposed to incident solar radiation, said assembly comprising:
   first means including an absorber panel for absorbing incident solar energy, said absorber panel being mounted to said vehicle in a passenger compartment thereof;
   second means including a cover panel mounted above said absorber panel for forming with said absorber panel an air flow channel, said cover panel being essentially transparent to optical wavelengths of electromagnetic radiation and impervious to infrared wavelengths, said air flow channel being located between said absorber panel and said cover panel;
   third means including an air inlet opening communicating with said air flow channel for enabling the introduction of air from the passenger compartment of the vehicle into said air flow channel; and
   fourth means including an air outlet opening communicating with said air flow channel for enabling the discharge of air from said air flow channel into the ambient atmosphere outside the vehicle.

2. The assembly defined in claim 1 wherein said cover panel has a surface facing said absorber panel, said surface being provided with a surface treatment reflecting infrared radiation.

3. The assembly defined in claim 1 wherein said cover panel is connected to said absorber panel in a form lock fit.

4. The assembly defined in claim 3 wherein said cover panel is connected to said absorber panel only by means of a form lock fit.

5. The assembly defined in claim 1 wherein said absorber panel is provided on a side facing said cover panel with means for facilitating heat exchange between said absorber panel and a stream of air flowing in said channel.

6. The assembly defined in claim 5 wherein said means for facilitating includes deflector ribs.

7. The assembly defined in claim 6 wherein said absorber panel is provided on the side facing said cover panel with a plurality of support ribs.

8. The assembly defined in claim 7 wherein said support ribs extend generally parallel to said stream and are provided at downstream ends with curved portions for changing the direction of air flow.

9. The assembly defined in claim 7 wherein said deflector ribs also function as support ribs.

10. The assembly defined in claim 1, further comprising means including a blower for facilitating the flow of air through said channel.

11. The assembly defined in claim 1 wherein said absorber panel is provided on a side facing said cover panel with solar cells.

12. The assembly defined in claim 1 wherein the assembly is provided for cooling a hat rack of the vehicle, said vehicle being provided with a hatchback door, said absorber panel and said cover panel forming a solar collector unit attached at one end to said door and pivotably attached at a opposite end to the vehicle 13. The assembly defined in claim 1 wherein said absorber panel is spaced from said cover panel so that said air flow channel additionally functions as a luggage compartment.

14. A method for cooling portions of a motor vehicle exposed to incident solar radiation, said method comprising the steps of:
   transmitting incident solar radiation through a cover panel essentially transparent to optical wavelengths of electromagnetic radiation and impervious to infrared wavelengths;
   heating an absorber panel with the solar radiation transmitted through said cover panel;
   channeling air from a passenger compartment of the vehicle through an air space between said absorber panel and said cover panel;
   transferring heat from said absorber panel to the air channeled through said air space; and exhausting the heated air to the ambient atmosphere surrounding the vehicle.

15. The method defined in claim 14 wherein said absorber panel and said cover panel form a portion of a dashboard shelf of the vehicle.

16. The method defined in claim 14 wherein said absorber panel and said cover panel form a portion of a hat rack shelf of the vehicle.

17. The method defined in claim 14 wherein said space additionally functions as a luggage compartment.

18. The method defined in claim 14 wherein said step of channeling includes the step of operating a blower to force air through said air space.

* * * * *